(12) United States Patent
Ye et al.

(10) Patent No.: US 9,252,653 B2
(45) Date of Patent: Feb. 2, 2016

(54) POWER FACTOR CORRECTION CONVERTER AND CONTROL METHOD THEREOF

(71) Applicant: Delta Electronics (Shanghai) Co., Ltd., Shanghai (CN)

(72) Inventors: Yi-Qing Ye, Shanghai (CN); Chao Yan, Shanghai (CN)

(73) Assignee: DELTA ELECTRONICS (SHANGHAI) CO., LTD. (CN)

( * ) Notice: Subject to any disclaimer, the term of this patent is extended or adjusted under 35 U.S.C. 154(b) by 142 days.

(21) Appl. No.: 14/246,194

(22) Filed: Apr. 7, 2014

(65) Prior Publication Data

US 2015/0022164 A1  Jan. 22, 2015

(30) Foreign Application Priority Data

Jul. 17, 2013  (CN) .......................... 2013 1 0300170

(51) Int. Cl.

| | |
|---|---|
| G05F 1/00 | (2006.01) |
| H02M 1/12 | (2006.01) |
| H02M 1/14 | (2006.01) |
| H02M 7/217 | (2006.01) |
| H02M 1/42 | (2007.01) |

(52) U.S. Cl.
CPC .......... *H02M 1/4208* (2013.01); *H02M 1/4225* (2013.01)

(58) Field of Classification Search
USPC .............. 323/259, 266, 268, 271; 363/44–46, 363/59–61, 124, 127, 128, 130
See application file for complete search history.

(56) References Cited

U.S. PATENT DOCUMENTS

| | | | | |
|---|---|---|---|---|
| 5,680,300 | A * | 10/1997 | Szepesi ................... | H02M 3/07 363/59 |
| 6,445,623 | B1 * | 9/2002 | Zhang ..................... | G11C 5/145 365/189.11 |
| 7,692,416 | B2 * | 4/2010 | Shimizu .............. | H02M 3/1582 323/222 |
| 8,446,099 | B2 * | 5/2013 | McCune, Jr. ........ | H05B 33/0815 315/250 |
| 2002/0051372 | A1 * | 5/2002 | Hoshino .................. | H02M 3/07 363/60 |
| 2012/0112724 | A1 * | 5/2012 | Nishida ................... | H02M 3/07 323/293 |

* cited by examiner

*Primary Examiner* — Adolf Berhane
*Assistant Examiner* — Gary Nash
(74) *Attorney, Agent, or Firm* — Hauptman Ham, LLP (57) ABSTRACT

A power factor correction converter and a control method are disclosed. A power factor correction converter includes a power conversion module, a capacitor, a third switch unit, and a fourth switch capacitor. The power conversion module includes a first switch, a second switch, a first switch unit, a second switch unit, and an inductor. The first switch is coupled to a first input terminal. The second switch is coupled to a second input terminal. The first switch is coupled between an output terminal and the first switch. The second switch is coupled between the output terminal and the second switch. The inductor is coupled between the first and the second switch unit. The capacitor is coupled to the output terminal. The third switch unit is coupled between the second input terminal and the capacitor. The fourth switch unit is coupled between the first input terminal and the capacitor.

23 Claims, 12 Drawing Sheets

POWER FACTOR CORRECTION CONVERTER AND CONTROL METHOD THEREOF

RELATED APPLICATIONS

This application claims priority to China Application Serial Number 201310300170.7, filed Jul. 17, 2013, which is herein incorporated by reference.

BACKGROUND

1. Field of Invention

The present invention relates to a power factor correction converter. More particularly, the present invention relates to a power factor correction converter having low conduction losses.

2. Description of Related Art

Figure 1A:
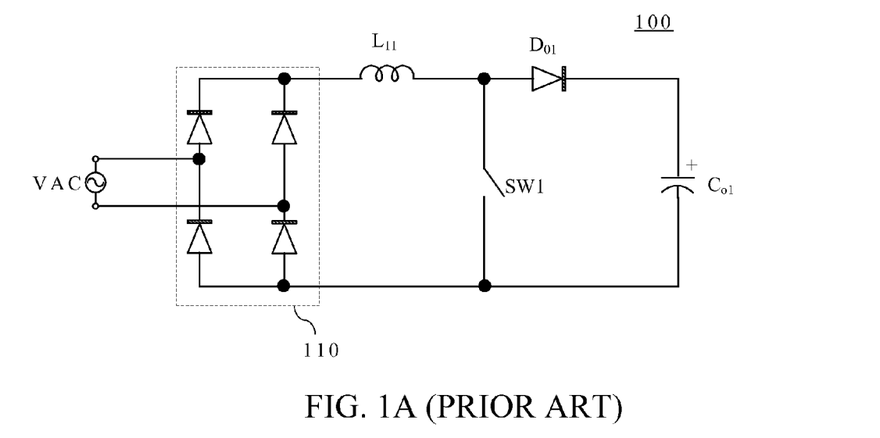
FIG. 1A depicts a power factor correction converter according to the prior art.

FIG. 1A depicts a power factor correction converter 100 according to the prior art. As shown in FIG. 1A, when a switch SW1 is turned on, a power factor correction inductor $L_{11}$ stores energy through a bridge rectifier 110. Conversely, when the switch SW1 is turned off, the power factor correction inductor $L_{11}$ releases energy to an output capacitor $C_{01}$, through a diode $D_{01}$. To put it simply, three semiconductor devices (such as diode) are turned on when the power factor correction inductor $L_{11}$ stores or releases energy, thus conduction losses of the power factor correction converter 100 are increased.

Figure 1B:
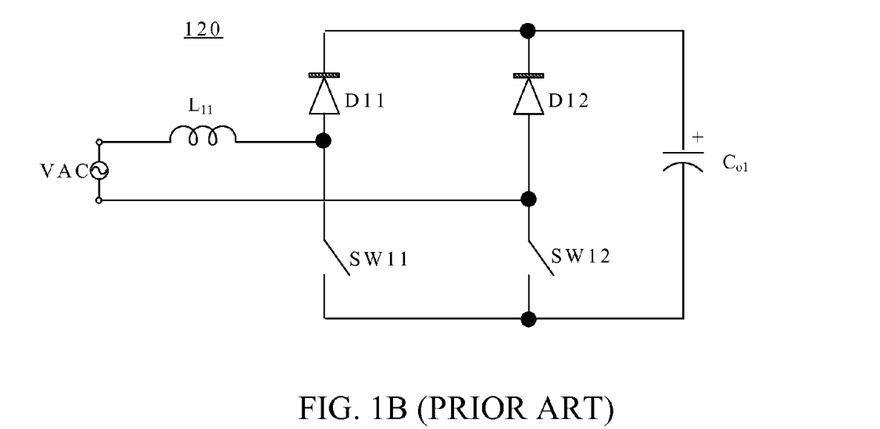
FIG. 1B depicts a bridgeless power factor correction converter according to the prior art.

FIG. 1B depicts a bridgeless power factor correction converter 120 according to the prior art. As shown in FIG. 1B, during the positive half cycle of voltage of the AC power VAC, a switch SW12 is kept being turned on and a switch SW11 and a diode D11 are selectively conducting. During the negative half cycle of voltage of the AC power VAC, the switch SW11 is kept being turned on and the switch SW12 and a diode D12 are selectively conducting. Under the circumstances, high frequency switching AC signals are generated between terminals of the AC power source VAC and the output voltage thus results in increased common mode noise of the power factor correction converter 120. Typically, an electromagnetic interference filter is disposed between the AC power source VAC and the power factor correction converter 120 to reduce common mode noise. However, with such a configuration, the total power consumption is increased and thus increases the conduction losses of the power factor correction converter 120.

In order to solve the aforementioned problems, those skilled in the art are striving to find a solution, but no applicable method has yet been put forward. Therefore, there is a need to reduce conduction losses while reducing common mode noise in a power factor correction converter.

SUMMARY

A power factor correction converter is provided. The power factor correction converter comprises a power conversion module, an output capacitor, a third switch unit, and a fourth switch unit. The power conversion module has a first input terminal, a second input terminal, and an output terminal. The first input terminal and the second input terminal are electrically coupled to an AC power source. The power conversion module comprises a first switch, a second switch, a first switch unit, a second switch unit, and a power factor correction inductor. The first switch is electrically coupled to the first input terminal. The second switch is electrically coupled to the second input terminal. The first switch unit is electrically coupled to the output terminal and the first switch unit and the first switch are electrically coupled to a first voltage node. The second switch unit is electrically coupled to the output terminal and the second switch unit and the second switch are electrically coupled to a second voltage node. The power factor correction inductor is electrically coupled between the first voltage node and the second voltage node. The output capacitor electrically is coupled to the output terminal for generating a DC output voltage. The third switch unit is electrically coupled between the second input terminal and the output capacitor. The fourth switch unit is electrically coupled between the first input terminal and the output capacitor.

According to one embodiment of the present disclosure, each of the first switch unit, the second switch unit, the third switch unit, and the fourth switch unit includes a switching device.

According to one embodiment of the present disclosure each of the first switch unit and the second switch unit includes a diode.

According to one embodiment of the present disclosure, each of the third switch unit and the fourth switch unit includes a slow reverse recovery diode.

According to one embodiment of the present disclosure, each of the first switch unit and the second switch unit includes a fast reverse recovery diode, each of the third switch unit and the fourth switch unit comprises a slow reverse recovery diode, and a reverse recovery time of the third switch unit and the fourth switch unit is more than two times of a reverse recovery time of the first switch unit and the second switch unit.

According to one embodiment of the present disclosure, the power factor correction converter further includes a sensing unit. The sensing unit and the output capacitor are electrically connected in series.

According to one embodiment of the present disclosure, the power factor correction converter further includes a sensing unit. The sensing unit is electrically coupled between the first input terminal and the AC power source.

According to one embodiment of the present disclosure, the power conversion module further includes a coupled inductor and a signal processing circuit. The coupled inductor is electrically coupled to the power factor correction inductor. The signal processing circuit is electrically coupled to the coupled inductor to detect a current flowing through the coupled inductor.

According to one embodiment of the present disclosure, the power factor correction converter further includes a DC/DC converter. The DC/DC converter is electrically coupled to the output terminal to adjust the DC output voltage.

According to one embodiment of the present disclosure, the DC/DC converter includes a LLC resonant converter, a LC resonant converter, a boost converter, a buck converter, or a buck-boost converter.

According to one embodiment of the present disclosure, the power factor correction further includes a first bypass diode and a second bypass diode. The first bypass diode is electrically coupled between the first input terminal and the output terminal. The second bypass diode is electrically coupled between the second input terminal and the output terminal.

The disclosure provides a power factor correction converter. The power factor correction converter includes a plurality of power conversion modules, an output capacitor, a third switch unit, and a fourth switch unit. Each of the power conversion modules has a first input terminal, a second input terminal, and an output terminal. The first input terminal and the second input terminal are electrically coupled to an AC power source. The first input terminals of the power conversion modules are coupled together. The second input terminals of the power conversion modules are coupled together. The output terminals of the power conversion modules are coupled together. Each of the power conversion modules comprises a first switch, a second switch, a first switch unit, and a second switch unit, and a power factor correction inductor. The first switch is electrically coupled to the first input terminal. The second switch is electrically coupled to the second input terminal. The first switch unit is electrically coupled to the output terminal and the first switch unit and the first switch are electrically coupled to a first voltage node. The second switch unit is electrically coupled to the output terminal and the second switch unit and the second switch are electrically coupled to a second voltage node. The power factor correction inductor is electrically coupled between the first voltage node and the second voltage node. The output capacitor is electrically coupled to the output terminals for generating a DC output voltage. The third switch unit is electrically coupled between the second input terminals and the output capacitor. The fourth switch unit is electrically coupled between the first input terminals and the output capacitor.

The disclosure further provides a method for controlling a power factor correction converter adapted for controlling the above-mentioned power factor correction converters. The method comprises the following steps: complementarily turning on the second switch and the second switch unit, turning on the first switch and the third switch unit, and turning off the first switch unit and the fourth switch unit during the positive half cycle of an AC power source to adjust an DC output voltage; and complementarily turning on the first switch and the first switch unit, turning on the second switch and the fourth switch unit, and turning off the second switch unit and the third switch unit during the negative half cycle of the AC power source to adjust the DC output voltage.

According to one embodiment of the present disclosure, the third switch unit is a slow reverse recovery diode to electrically couple a terminal of the output capacitor to the second input terminal when the second switch unit is turned off.

According to one embodiment of the present disclosure, the fourth switch unit is a slow reverse recovery diode, thereby a terminal of the output capacitor is electrically coupled to the first input terminal, when the first switch unit is turned off.

According to one embodiment of the present disclosure, the method further includes: providing a first bypass diode, wherein the first bypass diode is configured to be electrically coupled between the first input terminal and the output terminal; and providing a second bypass diode, wherein the second bypass diode is configured to be electrically coupled between the second input terminal and the output terminal. The first bypass diode, the second bypass diode, the third switch unit, and the fourth switch unit form a rectifier circuit to charge the output capacitor when an inrush current is generated by the AC power source.

In summary, the technical solution of the present disclosure has obvious advantages and beneficial effects as compared with the prior art. Through the above technical solution, considerable advances in technology and extensive industrial applicability can be achieved. With various combinations of operating modes, advantages of low conduction losses and low common mode noise are achieved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

Figure 2:
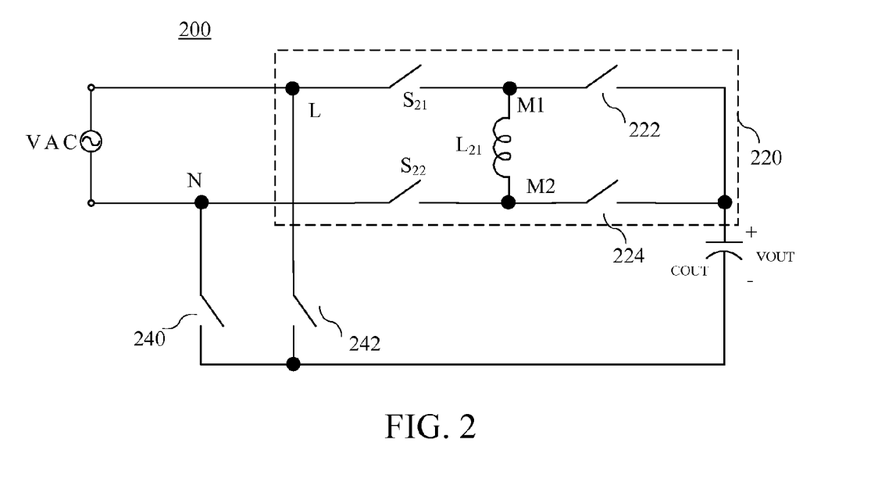
FIG. 2 depicts a power factor correction converter according to one embodiment of this disclosure.

FIG. 2 depicts a power factor correction converter 200 according to one embodiment of this disclosure. As shown in FIG. 2, the power factor correction converter 200 includes a power conversion module 220, an output capacitor COUT, a switch unit 240, and a switch unit 242. The power conversion module 220 has a first input terminal (L), a second input terminal (N), and an output terminal. The first input terminal (L) and the second input terminal (N) are electrically coupled to AC power source VAC. The power conversion module 220 includes a switch $S_{21}$, a switch $S_{22}$, a switch unit 222, a switch unit 224, and a power factor correction inductor $L_{21}$. The switch $S_{21}$ is electrically coupled to the first input terminal (L) of the power conversion module 220. The switch $S_{22}$ is electrically coupled to the second input terminal (N) of the power conversion module 220. The switch unit 222 is electrically coupled to the output terminal of the power conversion module 220, and the switch unit 222 and the switch $S_{21}$ are electrically coupled to a voltage node M1. The switch unit 224 is electrically coupled to the output terminal of the power conversion module 220, and the switch unit 224 and the switch $S_{22}$ are electrically coupled to a voltage node M2. The power factor correction inductor $L_{21}$ is electrically coupled between the voltage node M1 and the voltage node M2.

FIG. 3A to FIG. 3D depict schematic diagrams showing various operating modes of the power factor correction converter 200 in FIG. 2 according to various embodiments of this disclosure. In the present embodiment, each of the above-mentioned switch units 222, 224, 240, 242 includes a switching element. In operation, the power factor correction converter 200 is configured to alternately operate in operating modes shown in FIG. 3A and IFG. 3B during the positive half cycle of the voltage of the AC power source VAC. In the operating mode shown in FIG. 3A (hereafter referred to as "the first mode"), the switch $S_{21}$, the switch $S_{22}$, and the switch unit 240 are turned on, and the switch unit 222, the switch unit 224, and the switch unit 242 are turned off. Hence, the power factor correction inductor $L_{21}$ can be charged by the AC power source VAC via the switch $S_{21}$ and the switch $S_{22}$. In the operating mode shown in FIG. 3B (hereafter referred to as "the second mode"), the switch $S_{21}$, the switch unit 224, and the switch unit 240 are turned on, and the switch $S_{22}$, the switch unit 222, and the switch unit 242 are turned off. Hence, the output capacitor COUT can be charged by the AC power source VAC via the power factor correction inductor $L_{21}$ to adjust a DC output voltage VOUT. In the above-mentioned first and second modes, a negative terminal of the output capacitor COUT is kept electrically coupling to the second input node (N) via the switch unit 240, so as to reduce voltage jitters between the AC power source VAC and the output capacitor COUT. As a result, common mode noise of the power factor correction converter 200 is reduced.

Figure 3A:
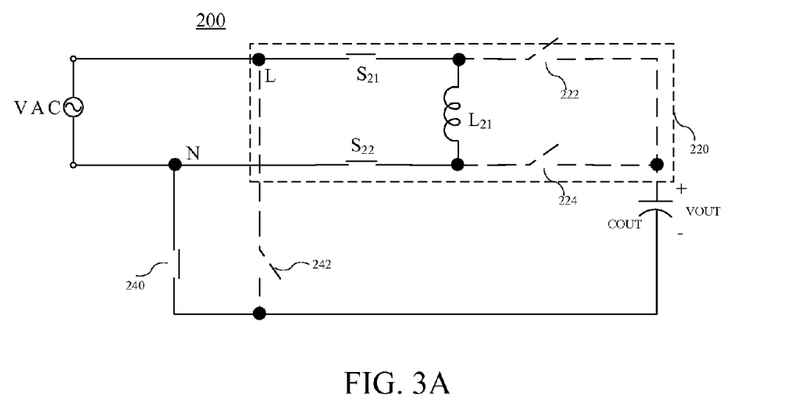
FIG. 3A to FIG. 3D depict schematic diagrams showing various operating modes of the power factor correction converter in FIG. 2 according to various embodiments of this disclosure.
Figure 3B:
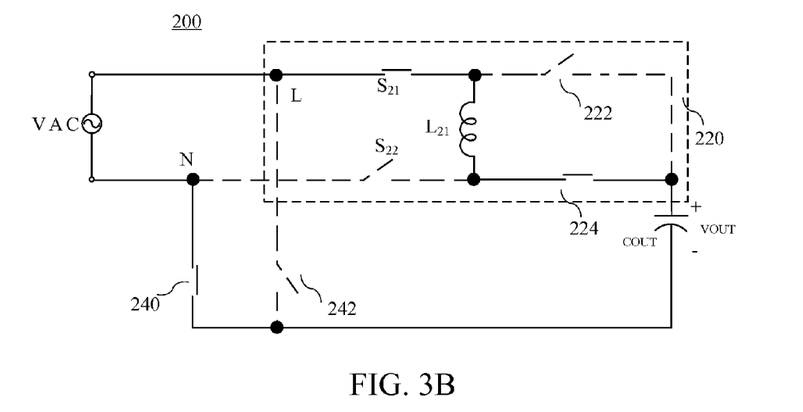
Figure 3C:
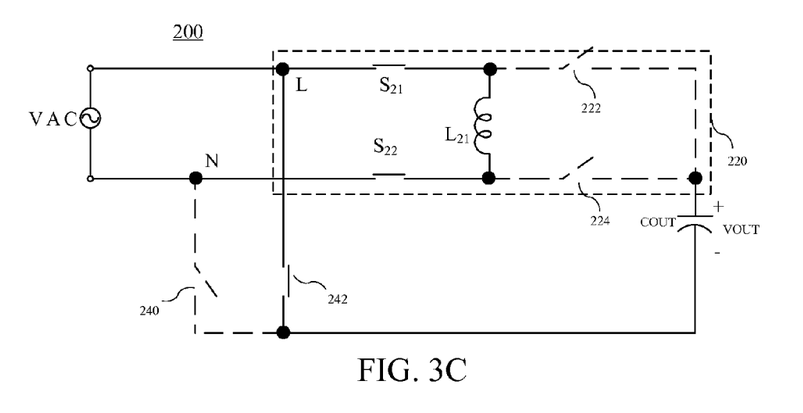
Figure 3D:
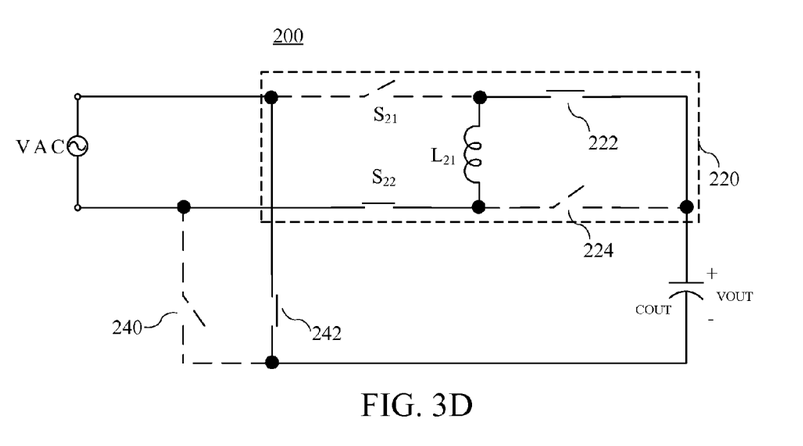

In addition, the power factor correction converter 200 is configured to alternately operate in operating modes shown in FIG. 3C and FIG. 3D during the negative half cycle of the AC power source VAC. In the operating mode shown in FIG. 3C (hereafter referred to as "the third mode"), the switch $S_{21}$, the switch $S_{22}$, and the switch unit 242 are turned on, and the switch unit 222, the switch unit 224, and the switch unit 240 are turned off. Hence, the power factor correction inductor $L_{21}$ can be charged by the AC power source VAC via the switch $S_{21}$ and the switch $S_{22}$. In the operating mode shown in FIG. 3D (hereafter referred to as "the fourth mode"), the switch $S_{22}$, the switch unit 222, and the switch unit 242 are turned on, and the switch $S_{21}$, the switch unit 224, and the switch unit 240 are turned off. Hence, the output capacitor COUT can be charged by the AC power source VAC via the power factor correction inductor $L_{21}$ to adjust the DC output voltage VOUT. In the above-mentioned third and fourth modes, the negative terminal of the output capacitor COUT is kept electrically coupling to the first input node (L) via the switch unit 242. Similarly, with such a configuration, common mode noise of the power factor correction converter 200 is also reduced.

Figure 4A:
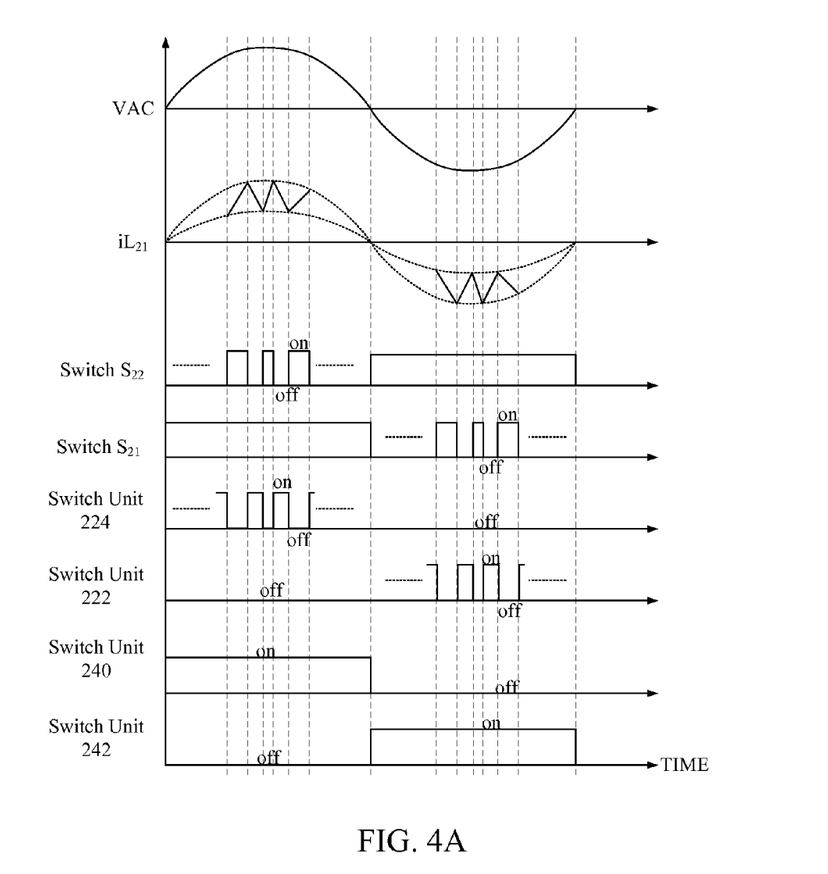
FIG. 4A depicts operating waveforms for various devices of the power factor correction converter in FIG. 2 according to one embodiment of this disclosure.

FIG. 4A depicts operating waveforms for various devices of the power factor correction converter 200 in FIG. 2 according to one embodiment of this disclosure. In FIG. 4A, each of the switch units and switches is turned on at a high voltage level and turned off at a low voltage level. As shown in FIG. 4A, according to the foregoing description, the switch $S_{21}$ and the switch unit 240 are both kept being turned on, the switch unit 222 and the switch unit 242 are both kept being turned off, and the switch $S_{22}$ and the switch unit 242 are complementarily conducting during the positive half cycle of the voltage of the AC power source VAC, no matter operating in the first mode or the second mode. For example, as shown in FIG. 4A, the power factor correction converter 200 operates in the first mode if the switch $S_{22}$ is turned on and the switch unit 224 is turned off during the positive half cycle of voltage of the AC power source VAC. The power factor correction converter 200 operates in the second mode if the switch $S_{22}$ is turned off and the switch unit 224 is turned on during the positive half cycle of the voltage of the AC power source VAC.

Similarly, no matter operating in the third mode or the fourth mode, the switch $S_{22}$ and the switch unit 242 are both kept being turned on, the switch unit 224 and the switch unit 240 are both kept being turned off, and the switch $S_{21}$ and the switch unit 222 are complementarily conducting during the negative half cycle of the voltage of the AC power source VAC. For example, as shown in FIG. 4A, the power factor correction converter 200 operates in the third mode if the switch $S_{21}$ is turned on and the switch unit 222 is turned off during the negative half cycle of the voltage of the AC power VAC. The power factor correction converter 200 operates in the fourth mode if the switch $S_{21}$ is turned off and the switch unit 222 is turned on during the negative half cycle the voltage of the AC power source VAC.

Figure 4B:
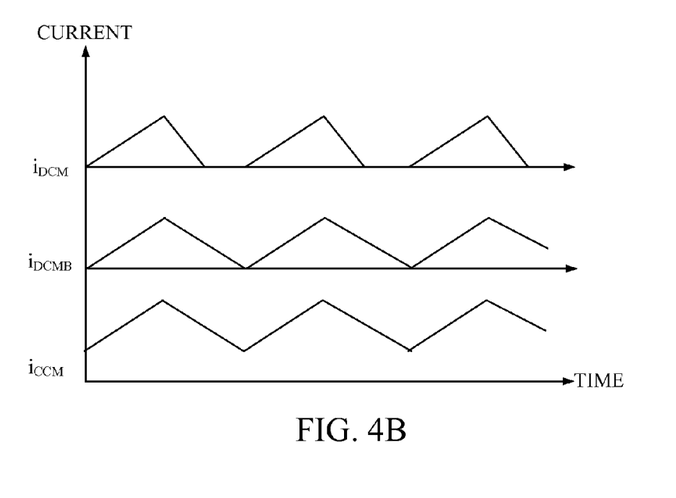
FIG. 4B depicts current waveforms for a power factor correction inductor L21 according to various embodiments of this disclosure.

FIG. 4B depicts current waveforms of the power factor correction inductor $L_{21}$ according to various embodiments of this disclosure. According to specifications of inductor and output loading in practical applications, the power factor correction inductor $L_{21}$ of the above-mentioned power factor correction converter 200 may operate in three different operating modes shown in FIG. 4B. For example, when the output loading is light, the power factor correction converter 200 operates in a discontinuous conduction mode (DCM) and the current waveform for the power factor correction inductor $L_{21}$ is shown by a current $i_{DCM}$. That is, the current of the power factor correction inductor $L_{21}$ has reached zero each time before the switches are switched. Or, the power factor correction converter 200 may operate in a critical conduction mode (CCM) and the current waveform for the power factor correction inductor $L_{21}$ is shown by a current $i_{DCMB}$. That is, the current of the power factor correction inductor $L_{21}$ just reaches zero each time before the switches are switched. Alternatively, when the output loading is heavy, the power factor correction converter 200 may operate in a continuous conduction mode (CCM) and the current waveform for the power factor correction inductor $L_{21}$ is shown by a current $i_{CCM}$. That is, the current of the power factor correction inductor $L_{21}$ is greater than zero each time before the switches are switched. The power factor correction converter 200 may alternately operate in the above three conduction modes or in a single conduction mode during one duty cycle based on application needs. Those of ordinary skill in the art may perform modifications and variations to the configuration as required, the present disclosure is not limited of the following embodiments.

In addition, according to the foregoing description, there are only two turned-on semiconductor devices on the charging paths of the output capacitor COUT by the power factor correction converter 200 to transmit current, no matter during the positive or negative half cycle of the AC power source VAC. Hence, the power factor correction converter 200 has the advantages of both reduced common mode noise and low conduction losses. It is to be understood that the following disclosure provides many different embodiments, or examples, for implementing different functions and operations of the above-mentioned power factor correction converter 200. These are, of course, merely examples and are not intended to be limiting.

Figure 5A:
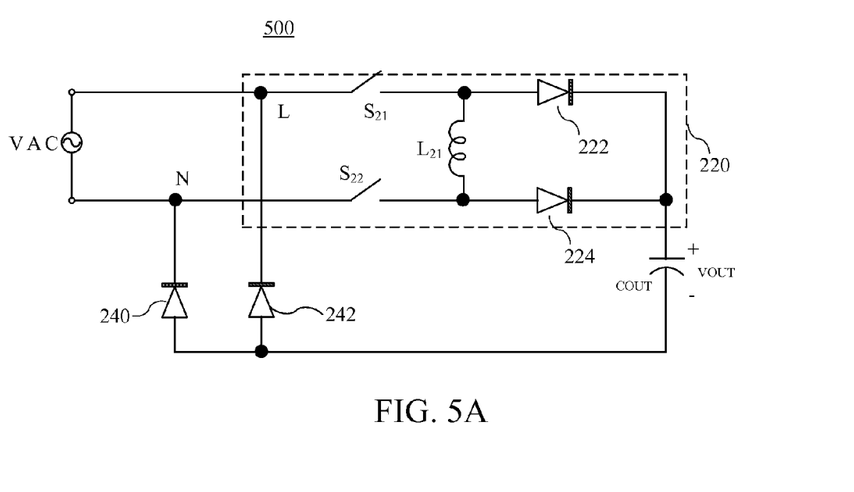
FIG. 5A depicts a schematic diagram of a power factor correction converter according to another embodiment of this disclosure.

FIG. 5A depicts a schematic diagram of a power factor correction converter 500 according to another embodiment of this disclosure. As shown in FIG. 5A, each of the switch unit 222, the switch unit 224, the switch unit 240, and the switch unit 242 may be a diode as compared with the above-mentioned power factor correction converter 200. Each of the switch unit 222 and the switch unit 224 is a fast reverse recovery diode, such as a silicon carbide (SiC) diode. Each of the switch unit 240 and the switch unit 242 is a slow reverse recovery diode, such as a common rectifier diode. A reverse recovery time of the switch unit 240 and the switch unit 242 is more than approximately two times of a reverse recovery time of the switch unit 222 and the switch unit 224. The above-mentioned "two times" has a certain degree of error rate that is normally within 25%.

Figure 5B:
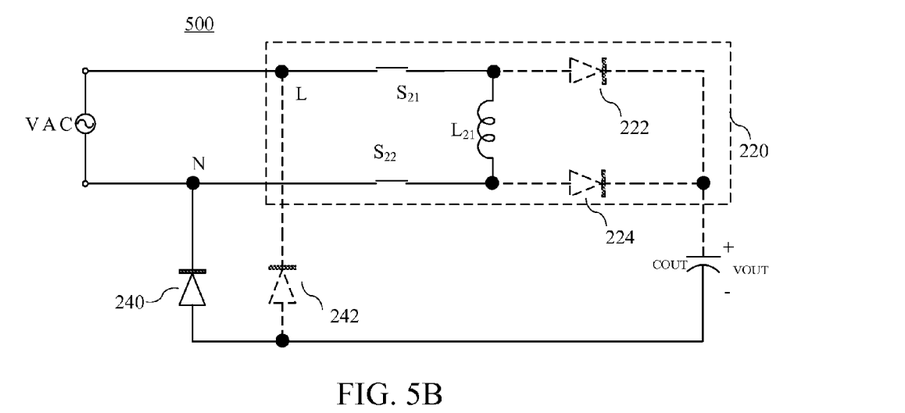
FIG. 5B depicts a schematic diagram showing an operation of the power factor correction converter of FIG. 5A in the first mode.
Figure 5C:
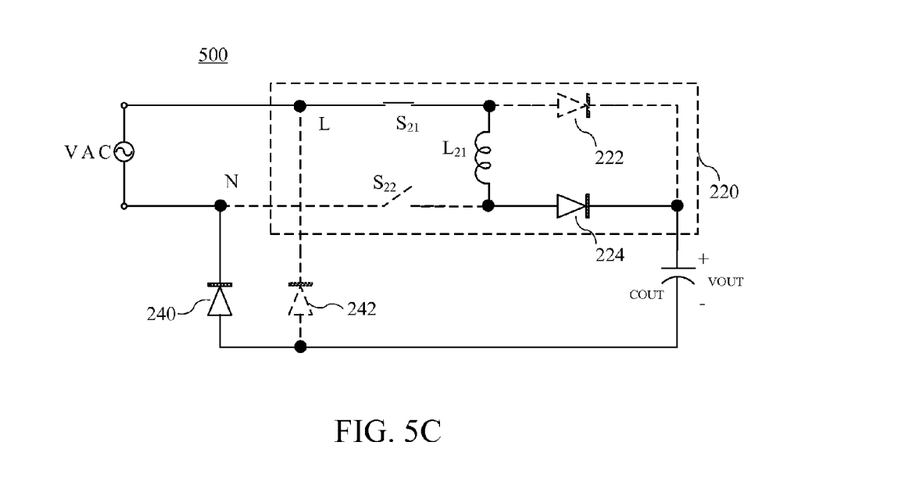
FIG. 5C depicts a schematic diagram showing an operation of the power factor correction converter of FIG. 5A in the second mode.

FIG. 5B depicts a schematic diagram showing an operation of the power factor correction converter 500 of FIG. 5A in the first mode. FIG. 5C depicts a schematic diagram showing an operation of the power factor correction converter 500 of FIG. 5A in the second mode. As shown in FIG. 5B and FIG. 5C, when the power factor correction converter 500 is switched between the first mode and the second mode, the reverse recovery of the switch unit 240 has not completed and the switch unit 240 is kept being turned on at the time of the switch unit 224 being cut-off, due to the switch unit 224 is a fast reverse recovery diode and the switch unit 240 is a slow reverse recovery diode. In this manner, the negative terminal of the output capacitor COUT is electrically coupled to the second input terminal (Ni) to reduce common mode noise.

Figure 5D:
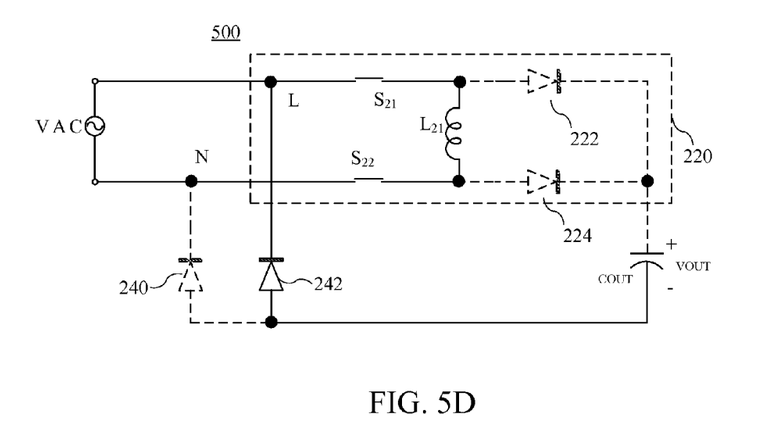
FIG. 5D depicts a schematic diagram showing an operation of the power factor correction converter of FIG. 5A in the third mode.
Figure 5E:
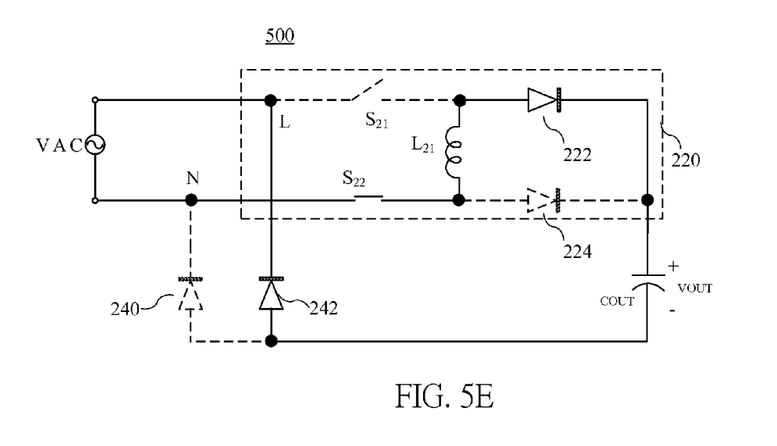
FIG. 5E depicts a schematic diagram showing an operation of the power factor correction converter of FIG. 5A in the fourth mode.

FIG. 5D depicts a schematic diagram showing an operation of the power factor correction converter 500 of FIG. 5A in the third mode. FIG. 5E depicts a schematic diagram showing an operation of the power factor correction converter 500 of FIG. 5A in the fourth mode. As shown in FIG. 5D and FIG. 5E, when the power factor correction converter 500 is switched between the third mode and the fourth mode, the reverse recovery of the switch unit 242 has not completed and the switch unit 242 is kept being turned on at the time of the switch unit 222 being cut-off. In this manner, the negative terminal of the output capacitor COUT is electrically coupled to the first input terminal (L) to reduce common mode noise.

It is noted that each of the switch unit 222, the switch unit 224, the switch unit 240, and the switch unit 242 is a diode according to the previous embodiment. Those of ordinary skill in the art may implement each of the switch unit 222 and the switch unit 224 by using a diode, and implement each of the switch unit 240 and the switch unit 242 by using a switching device. Alternatively, each of the switch unit 240 and the switch unit 242 may be implemented by using a slow reverse recovery diode, and each of the switch unit 222 and the switch unit 224 may be implemented by using a switching device. The power factor correction converter in the present disclosure may be implemented through the above-mentioned various combinations, however the present disclosure is not limited in thereof.

Figure 6:
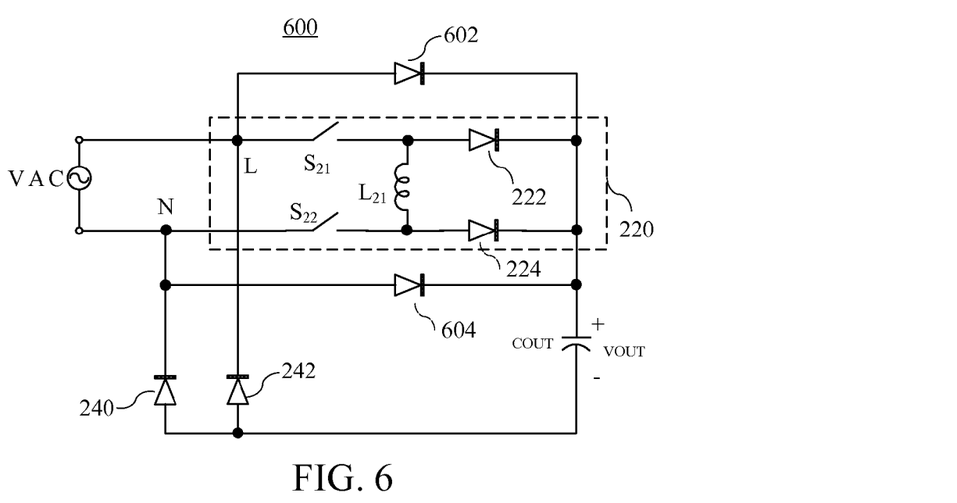
FIG. 6 depicts a schematic diagram of a power factor correction converter according to a further embodiment of this disclosure.

FIG. 6 depicts a schematic diagram of a power factor correction converter 600 according to a further embodiment of this disclosure. As shown in FIG. 6, the power factor correction converter 600 further includes a bypass diode 602 and a bypass diode 604 as compared with the power factor correction converter 200. The bypass diode 602 is electrically coupled between the first input terminal (L) and the output terminal of the power conversion module 220. The bypass diode 604 is electrically coupled between the second input terminal (N) and the output terminal of the power conversion module 220. The bypass diode 602, the bypass diode 604, the switch unit 240, and the switch unit 242 constitute a full bridge rectifier. At the instant of starting the AC power source VAC or generating an inrush current, the output capacitor COUT can be charged via the full bridge rectifier. In normal operation, the bypass diode 602 and the bypass diode 604 are cut-off since the output voltage VOUT is higher than the voltage of the AC power source VAC. Hence, the operation of the power factor correction converter 600 is not affected.

Figure 7:
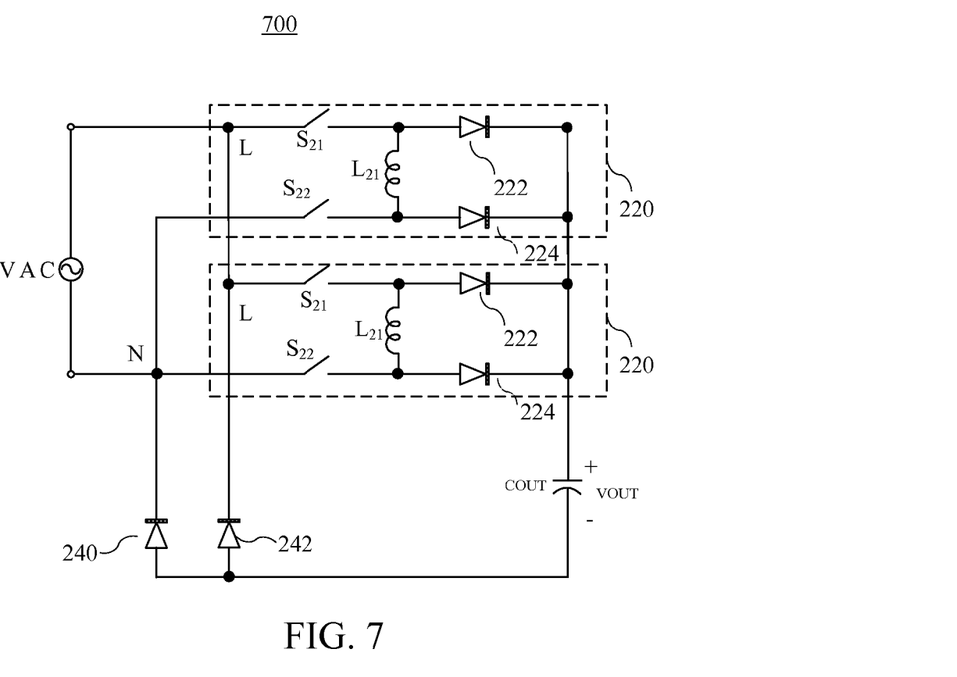
FIG. 7 depicts a schematic diagram of a power factor correction converter according to yet another embodiment of this disclosure.

FIG. 7 depicts a schematic diagram of a power factor correction converter 700 according to yet another embodiment of this disclosure. If the output power as required by application in practice is high, a plurality of power conversion modules 220 may be utilized to increase the output power. As shown in FIG. 7, in the power factor correction converter 700, the first input terminals (L) of the plurality of power conversion modules 220 are coupled together, the second input terminals (N) of the plurality of power conversion modules 220 are coupled together, and the output terminals of the plurality of power conversion modules 220 are coupled together. FIG. 7 is shown for purpose of illustration, those of ordinary skill in the art may change the number of the power conversion modules 220 used as required by practical specification.

Figure 8A:
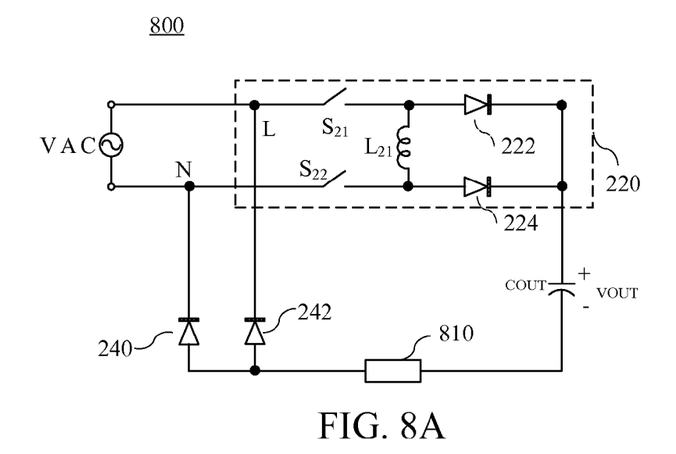
FIG. 8A to FIG. 8C depict schematic diagrams showing inductor current sensing according to various embodiments of this disclosure.
Figure 8B:
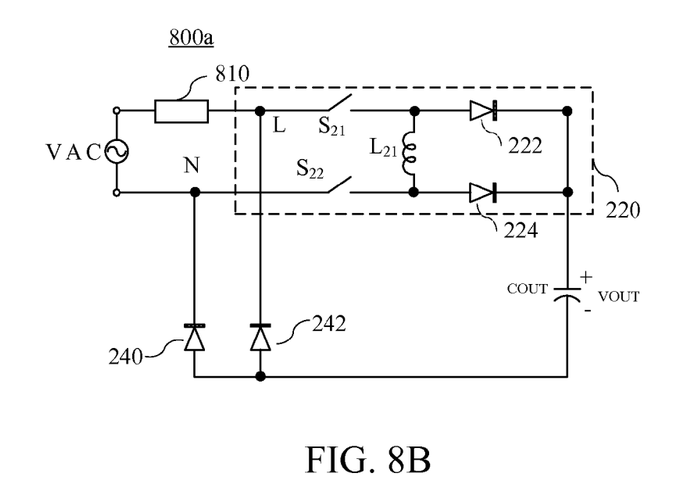
Figure 8C:
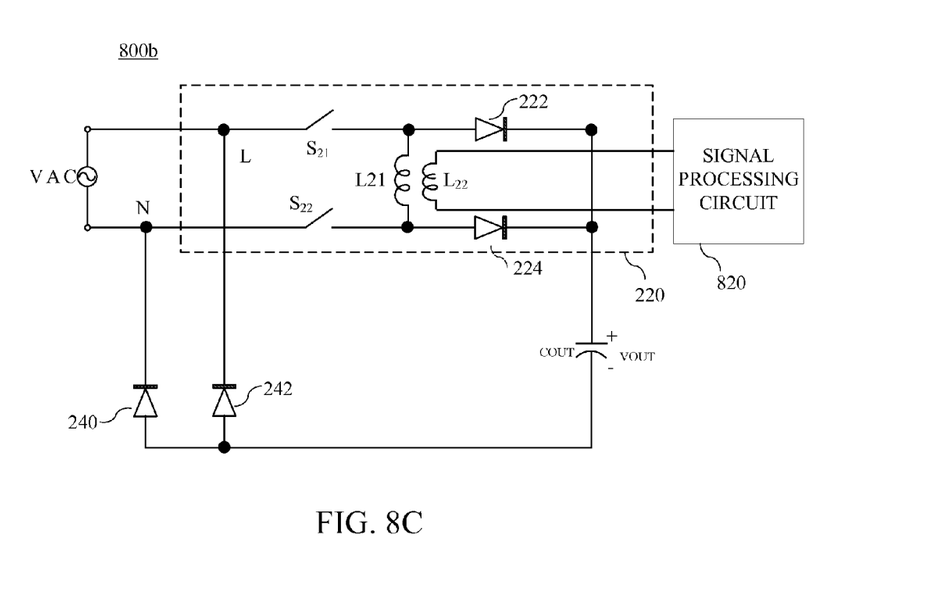

FIG. 8A to FIG. 8C depict schematic diagrams showing inductor current sensing according to various embodiments of this disclosure. In order to make power factor close to one, the inductor current is usually sensed for feedback control. As shown in FIG. 8A, the power factor correction converter 800 further includes a sensing unit 810 as compared with the foregoing embodiments. The sensing unit 810 and the output capacitor COUT are electrically connected in series to sense the total current flowing through the switch unit 240 and the switch unit 242, so as to indirectly obtain the magnitude of current flowing through the power factor correction inductor $L_{21}$. Alternatively, as shown in FIG. 8B, the sensing unit 810 may be disposed between the first input terminal (L) and the AC power source VAC. The sensing unit 810 includes a resistor, a current transformer, or a Hall effect sensor. As shown in FIG. 8C, the power conversion module 220 of the power factor correction converter 800b further includes a coupled inductor $L_{22}$ and a signal processing circuit 820 as compared with the foregoing embodiments. The coupled inductor $L_{22}$ is electrically coupled to the power factor correction inductor $L_{21}$ to reflect the current flowing through the power factor correction inductor $L_{21}$. The signal processing circuit 820 is electrically coupled to the coupled inductor $L_{22}$ so as to detect a current flowing through the coupled inductor $L_{22}$. Thus, the magnitude of the current flowing through the power factor correction inductor $L_{21}$ is obtained.

Figure 9:
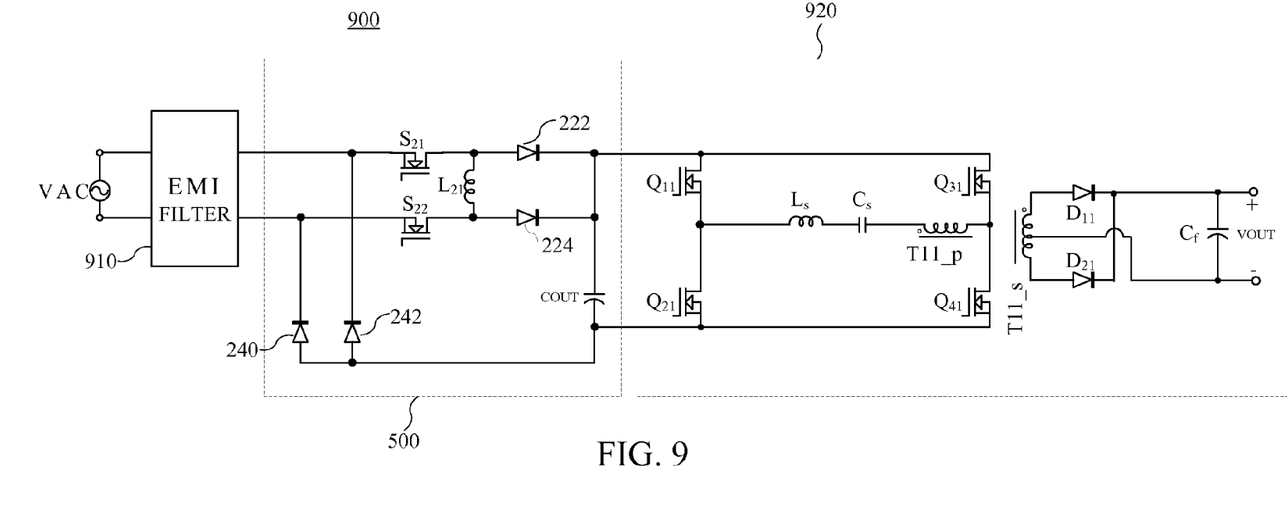
FIG. 9 depicts a schematic diagram of a power converter according to one embodiment of this disclosure.

FIG. 9 depicts a schematic diagram of a power converter according to one embodiment of this disclosure. The power converter 900 shown in FIG. 9 is an example of a typical application. As shown in FIG. 9, the power converter 900 includes an electromagnetic interference filter 910, the power factor correction converter 500, and a DC/DC converter 920. The electromagnetic interference filter 910 is disposed between the AC power source VAC and the power factor correction converter 500, so as to reduce electromagnetic interference. The DC/DC converter 920 includes various types of conversion circuits. For example, the DC/DC converter 920 may be a LLC series resonant circuit constituted by switches $Q_{11}$, $Q_{21}$, $Q_{31}$, $Q_{41}$, a resonant inductor $L_s$, a resonant capacitor $C_s$, a primary inductor T11_p, a secondary inductor T11_s, diodes $D_{11}$, $D_{21}$, and an output capacitor $C_f$, as shown in FIG. 9. The DC/DC converter 920 may also include various types of LC resonant converters, boost converters, buck converters, or buck-boost converters. In addition, the switch $S_{21}$ and the switch $S_{22}$ in FIG. 9 are implemented by using metal oxide semiconductor field effect transistors (MOSFETs). However, each of the switch $S_{21}$ and the switch $S_{22}$ may include various types of switching devices, such as a SiC MOSFET, a Gallium Nitride field effect transistor (GaN-FET), an insulated gate bipolar transistor (IGBT), etc. Source terminals of the two MOSFETs may be respectively coupled to the first input terminal (L) and the second input terminal (N) so as to reduce jitters of high frequency AC signals at ground terminals of the two MOSFETs. In the above-mentioned FIG. 7 to FIG. 9, those of ordinary skill in the art may dispose the bypass diode 602 and the bypass diode 604 (see FIG. 6) flexibly as required by application in practice to reduce the impact of the inrush current.

In another aspect, the present disclosure provides a method for controlling a power factor correction converter adapted for controlling the power factor correction converter 200 shown in FIG. 2. The control method controls the power factor correction converter 200 based on the AC power source VAC, so as to reduce common mode noise.

During the positive half cycle of voltage of the AC power source VAC, the switch $S_{22}$ and the switch unit 224 are complementarily conducting, the switch $S_{21}$ and the switch unit 240 are turned on, and the switch unit 222 and the switch unit 242 are turned off. With such a configuration, the DC output voltage VOUT is adjusted. For example, the power factor correction converter 200 alternately operates in the two modes shown in FIG. 3A and FIG. 3B during the positive half cycle of voltage of the AC power source VAC. At the same time, the switch unit 240 is kept being turned on to allow the negative terminal of the output capacitor COUT to be coupled to the second input terminal (N), thus the common mode noise is reduced.

During the negative half cycle of voltage of the AC power VAC, the switch $S_{21}$ and the switch unit 222 are complementarily conducting, the switch $S_{22}$ and the switch unit 242 are turned on, and the switch unit 224 and the switch unit 240 are turned off. With such a configuration, the output voltage VOUT is adjusted. For example, the power factor correction converter 200 alternately operates in the two modes shown in FIG. 3C and FIG. 3D during the negative half cycle of voltage of the AC power source VAC. At the same time, the switch unit 242 is kept being turned on to allow the negative terminal of the output capacitor COUT to be coupled to the first input terminal (L), thus the common mode noise is reduced.

In the above-mentioned method, each of the switch unit 240 and the switch unit 242 may be implemented by using a slow reverse recovery diode, such as in the power factor correction converter 500 shown in FIG. 5A. With such a configuration, the negative terminal of the output capacitor COUT is kept coupling to the first input terminal (L) or the second input terminal (N) when the switch unit 240 or the switch unit 242 is turned off to reduce common mode noise.

In addition, two bypass diodes may be further provided in the above-mentioned method. As shown in FIG. 6, the bypass diode 602 is disposed between the first input terminal (L) and the output terminal, and the bypass diode 604 is disposed between the second input terminal (N) and the output terminal. Hence, the bypass diode 602, the bypass diode 604, the switch unit 240, and the switch unit 242 constitute a full bridge rectifier. At the instant of generating an inrush current by the AC power source VAC, the output capacitor COUT can be charged via the full bridge rectifier.

In summary, the power factor correction converter in the present disclosure has the advantages of low common mode noise and low conduction losses. The power factor correction converter in the present disclosure is able to be further applied to various AC/DC converters.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A power factor correction converter, comprising:
a power conversion module having a first input terminal, a second input terminal, and an output terminal, the first input terminal and the second input terminal being electrically coupled to an AC power source, the power conversion module comprising a first switch, a second switch, a first switch unit, a second switch unit, and a power factor correction inductor, the first switch being electrically coupled to the first input terminal, the second switch being electrically coupled to the second input terminal, the first switch unit being electrically coupled to the output terminal and the first switch unit and the first switch being electrically coupled to a first voltage node, the second switch unit being electrically coupled to the output terminal and the second switch unit and the second switch being electrically coupled to a second voltage node, the power factor correction inductor being electrically coupled between the first voltage node and the second voltage node;

an output capacitor electrically coupled to the output terminal for generating a DC output voltage;

a third switch unit electrically coupled between the second input terminal and the output capacitor; and a fourth switch unit electrically coupled between the first input terminal and the output capacitor.

2. The power factor correction converter of claim 1, wherein each of the first switch unit, the second switch unit, the third switch unit, and the fourth switch unit comprises a switching device.

3. The power factor correction converter of claim 1, wherein each of the first switch unit and the second switch unit comprises a diode.

4. The power factor correction converter of claim 1, wherein each of the third switch unit and the fourth switch unit comprises a slow reverse recovery diode.

5. The power factor correction converter of claim 1, wherein each of the first switch unit and the second switch unit comprises a fast reverse recovery diode, each of the third switch unit and the fourth switch unit comprises a slow reverse recovery diode, and a reverse recovery time of the third switch unit and the fourth switch unit is more than two times of a reverse recovery time of the first switch unit and the second switch unit.

6. The power factor correction converter of claim 1, further comprising a sensing unit electrically coupled to the output capacitor in series.

7. The power factor correction converter of claim 1, further comprising a sensing unit electrically coupled between the first input terminal and the AC power source.

8. The power factor correction converter of claim 1, wherein the power conversion module further comprises:

a coupled inductor electrically coupled to the power factor correction inductor; and a signal processing circuit electrically coupled to the coupled inductor to detect a current flowing through the coupled inductor.

9. The power factor correction converter of claim 1, further comprising a DC/DC converter electrically coupled to the output terminal to adjust the DC output voltage.

10. The power factor correction converter of claim 9, wherein the DC/DC converter comprises a LLC resonant converter, a LC resonant converter, a boost converter, a buck converter, or a buck-boost converter.

11. The power factor correction converter of claim 1, further comprising:

a first bypass diode electrically coupled between the first input terminal and the output terminal; and a second bypass diode electrically coupled between the second input terminal and the output terminal.

12. A power factor correction converter, comprising:

a plurality of power conversion modules, each of the power conversion modules having a first input terminal, a second input terminal, and an output terminal, the first input terminal and the second input terminal being electrically coupled to an AC power source, the first input terminals of the power conversion modules being coupled together, the second input terminals of the power conversion modules being coupled together, the output terminals of the power conversion modules being coupled together, each of the power conversion modules comprising a first switch, a second switch, a first switch unit, and a second switch unit, and a power factor correction inductor, the first switch being electrically coupled to the first input terminal, the second switch being electrically coupled to the second input terminal, the first switch unit being electrically coupled to the output terminal and the first switch unit and the first switch being electrically coupled to a first voltage node, the second switch unit being electrically coupled to the output terminal and the second switch unit and the second switch being electrically coupled to a second voltage node, the power factor correction inductor being electrically coupled between the first voltage node and the second voltage node;

an output capacitor electrically coupled to the output terminals for generating a DC output voltage;

a third switch unit electrically coupled between the second input terminals and the output capacitor; and a fourth switch unit electrically coupled between the first input terminals and the output capacitor.

13. The power factor correction converter of claim 12, wherein each of the first switch unit, the second switch unit, the third switch unit, and the fourth switch unit comprises a switching device.

14. The power factor correction converter of claim 12, wherein each of the first switch unit and the second switch unit comprises a diode.

15. The power factor correction converter of claim 12, wherein each of the third switch unit and the fourth switch unit comprises a slow reverse recovery diode.

16. The power factor correction converter of claim 12, wherein each of the first switch unit and the second switch unit comprises a fast reverse recovery diode, each of the third switch unit and the fourth switch unit comprises a slow reverse recovery diode, and a reverse recovery time of the third switch unit and the fourth switch unit is more than two times of a reverse recovery time of the first switch unit and the second switch unit.

17. The power factor correction converter of claim 12, further comprising:

a DC/DC converter electrically coupled to the output terminal to adjust the DC output voltage.

18. The power factor correction converter of claim 17, wherein the DC/DC converter comprises a LLC resonant converter, a LC resonant converter, a boost converter, a buck converter, or a buck-boost converter.

19. The power factor correction converter of claim 12, further comprising:

a first bypass diode electrically coupled between the first input terminal and the output terminal; and a second bypass diode electrically coupled between the second input terminal and the output terminal.

20. A method for controlling a power factor correction converter, the power factor correction converter having a first input terminal, a second input terminal, and an output terminal, the first input terminal and the second input terminal being electrically coupled to an AC power source, the power factor correction converter comprising a first switch, a second switch, a first switch unit, a second switch unit, a power factor correction inductor, an output capacitor, a third switch unit, and a fourth switch unit, the first switch being electrically coupled to the first input terminal, the second switch being electrically coupled to the second input terminal, the first switch unit being electrically coupled to the output terminal and the first switch unit and the first switch being electrically coupled to a first voltage node, the second switch unit being electrically coupled to the output terminal and the second switch unit and the second switch being electrically coupled to a second voltage node, the power factor correction inductor being electrically coupled between the first voltage node and the second voltage node, the output capacitor being electrically coupled to the output terminal for generating a DC output voltage, the third switch unit being electrically coupled between the second input terminal and the output capacitor, the fourth switch unit being electrically coupled between the first input terminal and the output capacitor, the method comprising:

complementarily turning on the second switch and the second switch unit, turning on the first switch and the third switch unit, and turning off the first switch unit and the fourth switch unit during the positive half cycle of the AC power source to adjust the DC output voltage; and     complementarily turning on the first switch and the first switch unit, turning on the second switch and the fourth switch unit, and turning off the second switch unit and the third switch unit during the negative half cycle of the AC power source to adjust the DC output voltage.

21. The method of claim 20, wherein the third switch unit is a slow reverse recovery diode, thereby a terminal of the output capacitor is electrically coupled to the second input terminal when the second switch unit is turned off.

22. The method of claim 20, wherein the fourth switch unit is a slow reverse recovery diode, thereby a terminal of the output capacitor is electrically coupled to the first input terminal when the first switch unit is turned off.

23. The method of claim 20, further comprising:

providing a first bypass diode, wherein the first bypass diode is configured to be electrically coupled between the first input terminal and the output terminal; and     providing a second bypass diode, wherein the second bypass diode is configured to be electrically coupled between the second input terminal and the output terminal;

wherein the first bypass diode, the second bypass diode, the third switch unit, and the fourth switch unit form a rectifier circuit to charge the output capacitor when an inrush current is generated by the AC power source.

\* \* \* \* \*